Jan. 5, 1926.
O. FALKENWALDE
AUTOMATIC VALVE CUT-OFF
Filed Nov. 11, 1924 2 Sheets-Sheet 1.
1,568,817
Fig. 1.
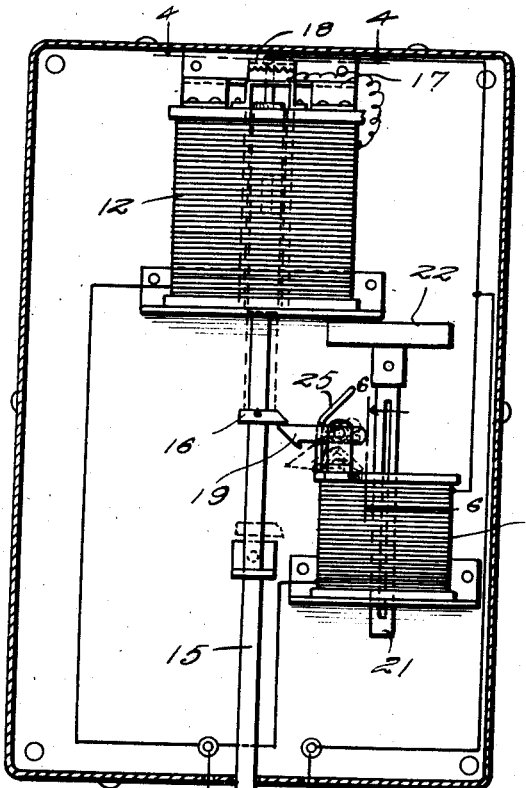
Fig. 6.
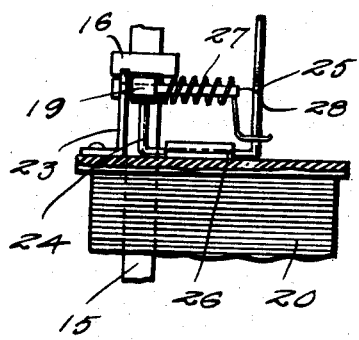
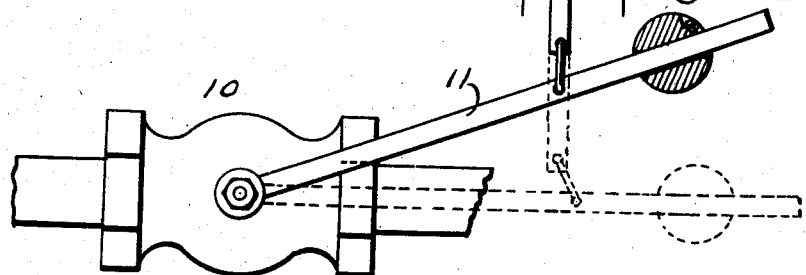
Fig. 4.
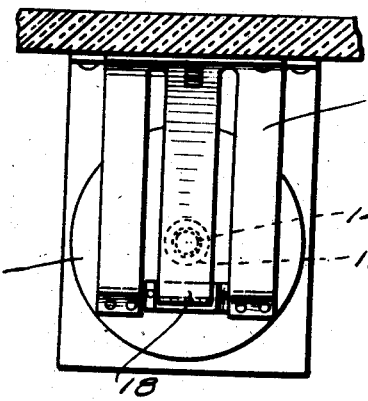
Inventor
O. Falkenwalde
Attorney Jan. 5, 1926.  
O. FALKENWALDE  
AUTOMATIC VALVE CUT-OFF  
Filed Nov. 11, 1924    2 Sheets-Sheet 2
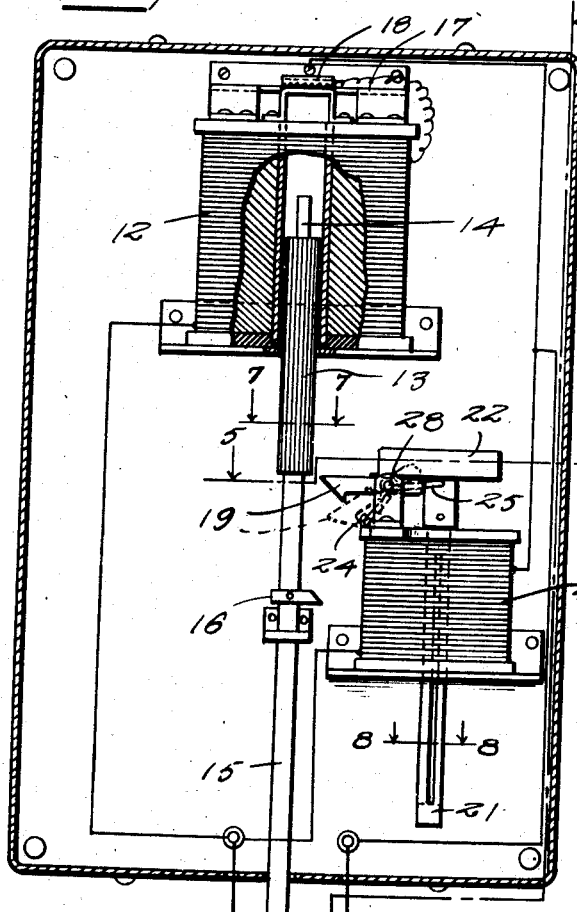
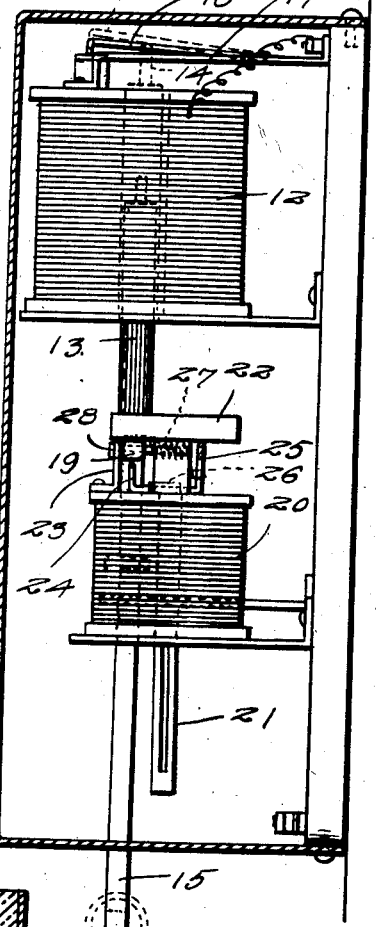
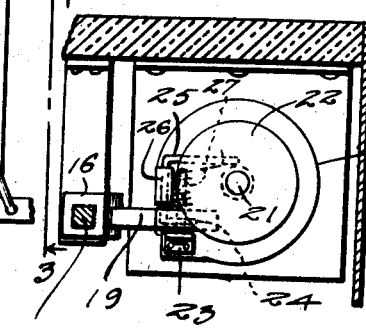
Inventor  
O. Falkenwalde.

Patented Jan. 5, 1926.

1,568,817

UNITED STATES PATENT OFFICE.

OSCAR FALKENWALDE, OF BALTIMORE, MARYLAND, ASSIGNOR TO ROBERT H. LYON, OF BALTIMORE, MARYLAND.

AUTOMATIC VALVE CUT-OFF.

Application filed November 11, 1924. Serial No. 749,240.

*To all whom it may concern:*

Be it known that I, OSCAR FALKENWALDE, a citizen of the United States, residing at Baltimore, in the State of Maryland, have invented certain new and useful Improvements in Automatic Valve Cut-Offs; and I do hereby declare the following to be a full, clear, and exact description of the invention, such as will enable others skilled in the art to which it appertains to make and use the same.

The present invention relates to pressure controlling means and provides an electrically operated mechanism for automatically opening and closing a pressure controlling valve according to predetermined conditions, the valve being automatically opened when closing an electric circuit and automatically closing when said circuit is interrupted from any cause, Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings a part of the specification,

Figure 1 is an elevational view of an electric valve controlling means embodying the invention, the casing enclosing the mechanism being in section, the full lines showing the valve open and the dotted lines in the position of the parts when the valve is closing, Figure 2 is a view similar to Figure 1, parts being broken away and showing the relation of the elements when the valve is closed, Figure 3 is a sectional view on the line 3—3 of Figure 2, Figure 4 is a detail sectional view of the switch mechanism on the line 4—4 of Figure 1, Figure 5 is a detail sectional view on the line 5—5 of Figure 2, Figure 6 is an enlarged sectional detail view on the line 6—6 of Figure 1, Figure 7 is a detail sectional view on the line 7—7 of Figure 2, and Figure 8 is a detail sectional view on the line 8—8 of Figure 2.

Corresponding and like parts are referred to in the following description and designated in the several views of the drawings by like reference characters.

The numeral 10 denotes a pressure controlling valve and 11 a lever fitted to the stem thereof and weighted so as to assume a closed position when released from the means normally holding the valve open when the pressure is flowing therethrough. The numeral 12 denotes a solenoid and 15 the armature thereof which is provided at its upper end with an extension 14 for tripping a switch and which is provided at its lower end with a rod 15 which is linked or otherwise connected to the lever 11. A stop 16 is provided on the rod 15 and operates to hold the valve open as indicated most clearly in Figure 1. The helix or winding of the solenoid 12 is included in an electric circuit containing a switch which comprises members 17 and 18, the latter being movable and adapted to be tripped by the extension 14 when the armature 13 is at the limit of its upward movement as indicated most clearly in Figure 3. At this time the stop 16 clears a latch 19 which engages thereunder and holds the rod 15 in elevated position.

A solenoid 20 is disposed below the solenoid 12 and to one side of the rod 15 and its armature 21 is weighted as indicated at 22 to insure a positive drop of the armature when the solenoid becomes deenergized. The solenoid 20 is utilized as a mount for the latch 19 which is pivoted to a bracket 23 mounted upon the solenoid. A detent 24 is adapted to engage under the latch 19 and hold it in position to support the rod 15 and this detent has a trip arm 25 connected thereto and disposed in the path of the weight 22 to be operated thereby when said weight drops. When the weight 22 drops which occurs when the solenoid 20 becomes deenergized, the detent 24 is withdrawn from beneath the latch 19, thereby permitting the rod 15 to drop and the valve 10 to automatically close and cut-off the the pressure. In the preferable construction the detent 24 and trip arm 25 form end portions of a wire which is pivoted at 26 to the solenoid 20. A coil spring 27 mounted upon a pin 28 has one end in engagement with the trip arm 25 and the other end in engagement with the latch 19 whereby to automatically return such part to normal position when the weight 22 and armature 21 are moved upward by the action of the solenoid 20 when the same is energized. The armature 13 is laminated and the armature 21 is formed with intersecting slots, such construction being preferred since it results in a more responsive action and prevents heating.

In practice, the parts being assembled substantially as shown in the accompanying drawings, and the circuit including the solenoids 12 and 20 being closed, the respective armatures 13 and 21 are attracted and moved upwardly thereby opening the pressure valve and setting the latch mechanism whereby the valve is held open under normal conditions. When the armature 13 reaches the limit of its upward movement, the extension 14 trips the movable member 18 of the switch thereby cutting the solenoid 12 out of circuit and at this time the stop 16 will have cleared the latch 19 which engages thereunder as indicated in Figure 1, thereby holding the valve open. However, should the circuit from any cause be interrupted to cause the solenoid 20 to become deenergized, its armature 21 will drop and trip the detent 24 and permit the latch 19 to drop and the rod 15 to move and the pressure valve to close, all as indicated most clearly in Figure 2. Upon reestablishing the circuit the parts assume normal operative position in the manner herein indicated and as shown most clearly by the full lines in Figure 1.

It will be understood that in operation the current in the solenoid 12 is required only for the period necessary to raise the armature 13 to open the valve, the same current energizing the solenoid 20 and releases the latch for operation to hold the armature in a raised position, the current being instantly cut off from armature 12 when the armature reaches its uppermost position and the valve will be held open while the current is maintained through solenoid 20. The instant that the current is cut off through solenoid 20 the armature 21 will drop, thus releasing the latch and armature 13 to permit the valve to close. This structure and operation will not only save the current necessary to actuate armature 13 continuously but will also prevent heating of the wire forming the solenoid 12 which because of the work that it has to perform is a wire of high resistance.

What is claimed is:—

Controlling means of the class described comprising a first solenoid and a second solenoid, each solenoid having a movable armature, means to urge movement of each armature when the respective solenoids are deenergized and in the direction opposite to the direction in which they are moved by the solenoids, a control member movable by the armature of the first solenoid, both solenoids being adapted for connection in electric circuit means for simultaneous energization, a switch to cut out the first solenoid while the second solenoid remains energized and through the movement of the armature of the first solenoid by the latter, means to normally prevent movement of the armature of the first solenoid when the latter is deenergized, the last mentioned means being controllable by the movement of the armature of the second solenoid upon deenergization of the latter, the last mentioned means comprising a trip, means pivoting said trip to the second solenoid, and a detent coacting with said trip and normally maintaining it in detaining relation with the armature of the first solenoid, and said trip being directly operable by the armature of the second solenoid.

In testimony whereof I affix my signature.

OSCAR FALKENWALDE.